United States Patent
Weber

3,676,796
July 11, 1972

[54] PROCESS AND DEVICE FOR THE GENERATION OF A SINGLE-FREQUENCY LIGHT RAY

[72] Inventor: Heinz Weber, Munchenbuchsee, Switzerland

[73] Assignee: Institut fur angewandte Physik der Universitat Bern, Bern, Switzerland

[22] Filed: Nov. 18, 1970

[21] Appl. No.: 90,840

Related U.S. Application Data

[63] Continuation of Ser. No. 718,810, April 4, 1968, abandoned.

[30] Foreign Application Priority Data

April 13, 1967 Switzerland ..........................5218/67

[52] U.S. Cl.............................................331/94.5, 350/160
[51] Int. Cl.............................................................H01s 3/10
[58] Field of Search.................................331/94.5; 350/160

[56] References Cited

UNITED STATES PATENTS 3,471,799  10/1969  Evtuhov.................................331/94.5
3,432,770   3/1969  Massey...................................331/94.5

OTHER PUBLICATIONS

Massey et al., Generation of Single–Frequency Light Using the FM Laser. Appl. Phys. Letters, Vol. 6, No. 1(Jan 1, 1965)pp 10– 11

*Primary Examiner*—William L. Sikes
*Attorney*—Ernest F. Marmorek

[57] ABSTRACT

A method of generating a single frequency laser light ray comprising: frequency modulating two oscillating modes or self-oscillations of a laser oscillator at a modulation frequency which approximates the frequency distance of adjacent modes; orthogonally polarizing these rays and passing them through an optically non-linear, birefringeant element the optical axis of which is inclined to their path at such an angle as to produce a maximum interaction therebetween. Due to the maximum non-linear interaction an unmodulated, single frequency output ray is obtained the frequency of which equals the sum of the carrier frequencies of respective rays.

5 Claims, 3 Drawing Figures

Patented July 11, 1972   3,676,796

PROCESS AND DEVICE FOR THE GENERATION OF A SINGLE-FREQUENCY LIGHT RAY

This is a continuation of application Ser. No. 718,810, filed Apr. 4, 1968 and now abandoned.

The invention relates to a process for the generation of a single-frequency light ray by means of a laser device while coupling the laser oscillations with a modulation frequency $\Omega$ by frequency modulation to a frequency modulated ray. The modulation frequency is approximately equal to the frequency distance $\Delta\gamma$ of adjacent self-oscillations.

The process has as a salient feature the generation of two frequency modulated rays, orthogonally polarized relative to each other, modulated by the modulation frequency named and of equal frequency deviation. One of these rays is delayed relative to the other by an odd-numbered multiple of a time $T = 1/2\,\Omega$, permitting one ray to pass as ordinary and the other as extraordinary ray through a birefringent, nonlinear crystal, and the optic axis of the crystal is oriented at such an angle relative to the direction of the rays that the nonlinear reciprocation between them is maximal, thus attaining an unmodulated light ray whose frequency equals the sum of the carrier frequencies of the two frequency modulated rays.

The process according to the invention is a more direct and simpler method of attaining a single frequency light ray of double the laser frequency, compared to other methods. The process is particularly advantageous upon the use of a gas discharge amplifier element.

In one embodiment of the invention, both the frequency modulated rays are generated by means of a frequency modulator disposed between the two reflectors of a laser oscillator and by means of a birefringent element which is also disposed between these reflectors, so that these rays have different carrier frequencies and are polarized orthogonally toward each other. The birefringent element thereby may be the non-linear crystal named, or else the frequency modulator itself or a further birefringent crystal.

The invention furthermore relates to a device for carrying out the process. In this device, a frequency modulator and a birefringent element are disposed between the two reflectors of a laser oscillator.

The invention now will be more fully explaned with reference to the accompanying drawings. However, it should be understood that these are given merely by way of illustration, and not of limitation, and that it is intended to cover all variations and modifications which do not constitute a departure from the spirit and the scope of the invention as hereinafter claimed.

Figure 1:
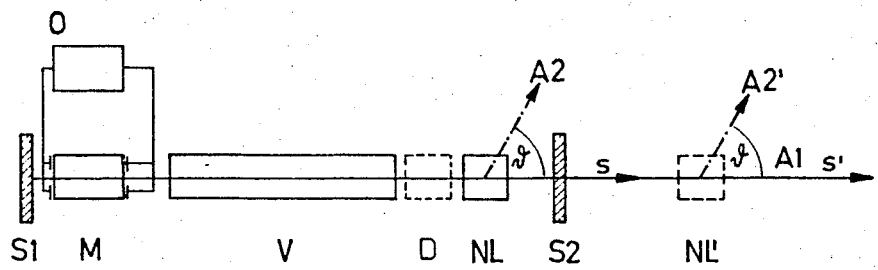
FIG. 1 is an elevation, in schematic, of one embodiment of a device for the generation of a single-frequency ray.

Referring now to these drawings, the arrangement shown in FIG. 1 has a laser amplifier element V for the formation of a laser oscillator which is disposed between reflectors S1 and S2. The element V, for example, may be an He-Ne gas discharge tube, and between it and reflector S2 an optically nonlinear birefringent crystal NL is disposed which, for instance, may be potassium di-H phosphate (KDP), while between amplifier element V and reflector S1 a frequency modulator M is positioned. The emission of this laser arrangement has a wave length $\lambda = 1,15\,\mu$.

The optic axis A2 of crystal NL, relative to ray axis A1, is disposed at angle $\Theta$ for maximal reciprocal action which, for this wave length and the KDP crystal, is approximately 60°. Frequency modulator M may also be a KDP crystal whose optic axis lies in the direction of the ray. Moreover, at two opposite surfaces of the crystal of modulator M, electrodes are provided which have an opening for the passage of the ray and which are fed with a potential of a frequency of, e.g., 100 MHz from an oscillator O. The axial system of the modulator crystal is selected so that the intersection of the axes of the induced double refraction is oriented in the same manner as that of crystal NL.

Due to the potential applied, the index of refraction of the modulator crystal changes with the cycle of frequency $\Omega$. The change of the optical path thus effected between reflectors S1 and S2 yields a frequency modulation of the rays generated in the laser oscillator V, S1, S2.

Figure 2:
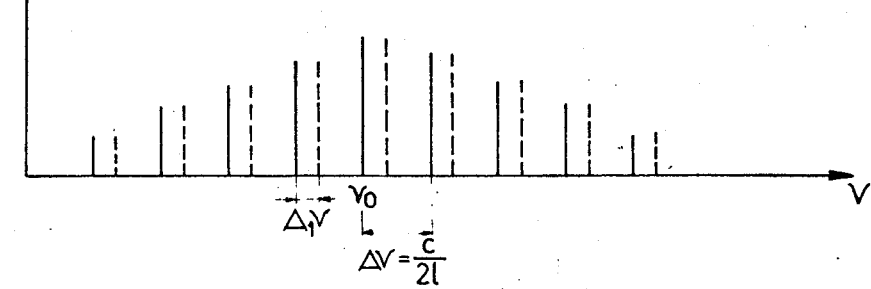
FIG. 2 is a diagram illustrating the action of the embodiment shown in FIG. 1.

It is known that light rays of different inherent frequency (eigenfrequency) are generated, and FIG. 2 illustrates schematically the intensity J of a plurality of self-oscillations m as a function of the light frequency $\gamma$. The distance $\Delta\gamma$ between two adjacent inherent frequencies equals $c/2l$ whereby c is the speed of light and $l$ is the optical distance between the two reflectors. No definite phase relationship exists between the several self-oscillations m so that, in the absence of means to be taken, the intensity of the usable rays leaving the laser oscillator is subject to great fluctuations because the partial rays of different inherent frequency are superimposed on each other in a random manner.

When the several self-oscillations $m$, generated in a laser oscillator are frequency-modulated with a modulation frequency $\Omega$ which approximates the frequency $\Delta\gamma$, a definite phase relationship between the self-oscillations ensues, and the usable ray constitutes a frequency-modulated oscillation of modulation frequency $\Omega$, i.e., a carrier frequency $\gamma_o$ having side bands at intervals $\Delta\gamma$. If solely one frequency is desired within the usable ray, the usable ray, according to a known method, can be modulated again with the same frequency $\Omega$ in counterphase, whereby the energy of all side bands changes over into the solely remaining carrier frequency.

However, according to the invention, a single-frequency usable ray is generated whose frequency is practically twice the carrier frequency $\gamma_o$. The double refraction of crystal NL or of modulator M plus NL has the effect that, aside from the group of self-oscillations discussed above, a second group of self-oscillations m' is present which, as a unit, is displaced by a small frequency $\Delta_1\gamma$, whereby the two rays are polarized orthogonally relative to each other and one group corresponds to the ordinary, the other to the extraordinary ray passing through crystal NL. Owing to the nonlinearity of crystal NL, these two rays interact, and an output ray of twice the laser frequency is obtained. However, this effect practically occurs only when the optic axis A2 is at the angle $\Theta$ 60° relative to the direction A1 of the rays. Even at very slight deviations from the optimal value of angle $\Theta$ the reciprocation decreases strongly.

When the electrical field intensities of the ordinary and extraordinary beams are designated as $e_o$ and $e_a$, respectivly, the following equations apply:

$$e_o Z\, A \cos\{2\pi_o\tau + q \sin 2\pi\,\Omega\,\tau\}$$

$$e_a Z\, B \cos\{2\pi_o'\tau + 2\pi Y_o'\,T + q \sin\Omega 2\pi\,(\tau) + T)\}$$

wherein $\gamma_o$ and $\gamma_o'$ are the frequencies of the self-oscillations of groups $m$ and $m'$, respectively, $q$ is the modulation deviation and T the delay of the modulation of one ray relative to the other. The particular disposition of the electrodes of modulator M on the crystal is attained because the index of refraction for the ordinary ray increases while simultaneously that for the extra-ordinary ray decreases, so that $T = 1/2\Omega$.

Then $$e_a Z\, B \cos\{2\pi\gamma_o'Z + 2\pi\gamma_o'T - q \sin 2\pi\Omega\tau\}$$

In the modulation product $e_o e_a$ the sum quota is regarded, it becomes proportional to $$E\,A\,K \cos\{2\pi(Y_o + Y_o')\tau + 2\pi(Y_o'T)\} \text{ wherein K is the nonlinear coupling factor.}$$

The difference quota of the modulation product $e_o \cdot e_a$ can be disregarded because the difference frequencies $\gamma_o - \gamma_o$, do not come within the same range.

By the method as described a usable ray s of only one frequency is obtained from the laser arrangement whereby this frequency practically is twice as large as the usually obtained frequency $\gamma_o$. It should be noted that the modulation frequency $\Omega$ must not exactly match the frequency difference $\Delta\gamma$ of adjacent self-oscillations in order to have the device work in the manner described. On the other hand, the difference between $\Omega$ and $\Delta\gamma$ must be very slight, approximately in the order of a few per mils.

In an embodiment illustrated in FIG. 1 by broken lines, the nonlinear crystal NL' is disposed outside reflector S2, in lieu of being between the same and amplifier element V. If the modulator M is not itself birefringent, another birefringent crystal D must take the place of NL in the interior of the oscillator in order to generate the two rays of different carrier frequency, orthogonally polarized to each other. The considerations advanced above are not changed thereby, and the ray s' leaving crystal NL' is a single-frequency ray whose frequency equals the sum of the carrier frequencies $\gamma_o$ and $\gamma_o'$, hence is approximately $2\gamma_o$. Which of these two embodiments is to be preferred depends upon the proportion of internal amplification to the internal losses in the path of a ray from reflector S1 to reflector S2 and back.

Figure 3:
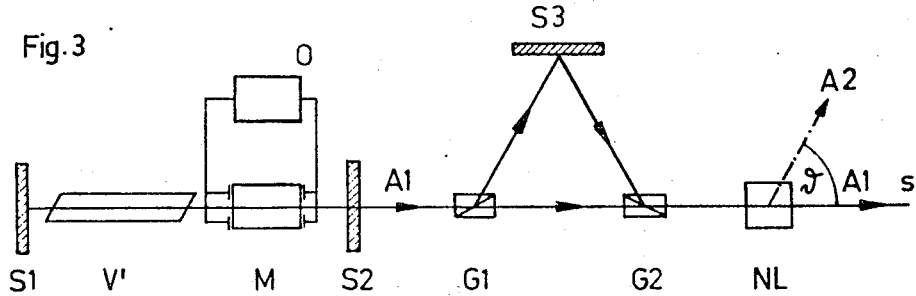
FIG. 3 is a schematic elevation of another embodiment of the invention.

In the arrangement shown in FIG. 3, a laser amplifier element V' is disposed between reflectors S1 and S2 which favors one polarization direction, for instance, by means of windows below the Brewster angle. Between amplifier element V' and reflector S2 the frequency modulator M, excited by oscillator O, is disposed. In this arrangement, the ray passing through reflector S2 is polarized only in one direction and suitable provisions are made to have the polarization plane approximately 45° relative to the drawing plane. Two ray-splitting Glan-Thompson prisms G1 and G2 are inserted in axis A1. Prism G1 splits the ray into two orthogonally polarized partial rays, one of which reaches prism G2 directly, and the other by way of reflector S3. The partial rays then together fall on a nonlinear, birefringent crystal NL whose optic axis A2 again is inclined at angle $\Theta$ relative to axis A1.

The difference of the optical paths between prisms G1 and G2 is adjusted so that the delay between the two oscillations is an odd-numbered multiple of $$T = \frac{1}{2\Omega} = \frac{1}{2 \cdot c/2l} = \frac{l}{c}.$$

In crystal NL the modulation product of the two oscillations having field intensities $e_o$ and $e_a$ again is formed. The sole difference from the first embodiment is that merely one group of self-oscillations m is present. $\gamma_o'$ therefore equals $\gamma_o$, and a single-frequency ray is obtained whose frequency $2\gamma_o$ equals twice the frequency $\gamma_o$ of the principal self-oscillation of the laser oscillator.

The surfaces of elements M, V, D, NL, through which the laser ray passes, are to be antireflection coated in order to ensure proper functioning of the device.

It should be understood that, while merely potassium di-H phosphate has been named as a birefringeant, nonlinear crystal, any other crystal of these qualifications may be used.

I claim:

1. A process for the generation of a single-frequency light ray by laser means in which the laser's self-oscillations are coupled by frequency modulation having a modulation frequency $\Omega$ which slightly deviates from the frequency difference between adjacent self-oscillations of the laser, comprising generating two frequency modulated rays, orthogonally polarized relative to each other and having respective carrier frequencies modulated by said modulation frequency and having equal frequency deviation from the carrier frequency, passing one of said rays as ordinary, and the other as extraordinary ray commonly through a birefringeant, optically nonlinear element whose optic axis is oriented at such an angle relative to the direction of the rays as to render the nonlinear interaction of the two orthogonally polarized rays maximal; and delaying one of these rays relative to the other by an odd-numbered multiple of a time $T = 1/2\Omega$;

whereby an unmodulated light ray is obtained at the output of said birefringeant, optically non-linear element, the single frequency of which equals the sum of the carrier frequencies of said two frequency modulated rays.

2. A process for the generation of a single-frequency light ray by laser means in which the laser's self-oscillations are coupled by frequency modulation having a modulation frequency $\Omega$ which slightly deviates from the frequency difference between adjacent self-oscillations of the laser, comprising generating two frequency modulated rays, orthogonally polarized relative to each other and having said modulation frequency and having equal frequency deviation from the carrier frequency, delaying one of these rays relative to the other by an odd-numbered multiple of a time $T = 1/2\Omega$; and passing one of said rays as ordinary, and the other as extraordinary ray commonly through a birefringeant, nonlinear element whose optic axis is oriented at an angle relative to the direction of the rays which angle renders the nonlinear interaction maximal;

whereby an unmodulated light ray is obtained the said frequency of which equals the sum of the carrier frequencies of said two frequency-modulated rays.

3. A device for the generation of a single-frequency light ray comprising a laser oscillator in which the laser's self-oscillations are coupled by frequency modulation, said oscillator comprising a laser amplifier having a longitudinal axis, one reflector arranged on said longitudinal axis opposite one end of said amplifier and a second reflector arranged on said longitudinal axis opposite the other end of said amplifier;

a frequency modulator disposed between one reflector and the laser amplifier;

a birefringeant, optically nonlinear crystal having an optical axis oriented at an angle with respect to said longitudinal axis of said laser amplifier and being disposed between said laser amplifier and the second reflector;

said laser oscillator producing two orthogonally polarized, frequency modulated rays having a modulation frequency which slightly deviates from the frequency difference between adjacent self-oscillations, said angle being selected according to the characteristic of said birefringeant, non-linear element for causing maximum interaction between said rays; and means delaying said rays with respect to each other;

whereby an unmodulated light ray is obtained whose frequency equals the sum of the carrier frequencies of said two frequency modulated rays.

4. A device for the generation of a single-frequency light ray comprising a laser oscillator in which the laser's self-oscillations are coupled by frequency modulation, said oscillator comprising a laser amplifier having a longitudinal axis;

a reflector disposed on said longitudinal axis at each end of said laser amplifier;

a frequency modulator disposed between one reflector and the laser amplifier;

said modulator being a birefringeant element having an optical axis oriented along said longitudinal axis;

a non-linear birefringeant KDP crystal having an optical axis oriented at an angle with respect to said longitudinal axis;

said laser oscillator producing two orthogonally polarized frequency modulated rays having a modulation frequency $\Omega$ which slightly deviates from the frequency difference $\Delta\gamma$ between adjacent self-oscillations;

said angle being selected according to the characteristic of said non-linear birefringeant crystal for causing maximum interaction between said two rays;

and means delaying said rays with respect to each other;

whereby an unmodulated light ray is obtained whose frequency equals the sum of the carrier frequencies of said modulated rays.

5. A device for the generation of a single-frequency light ray comprising
 a laser oscillator in which the laser's self-oscillations are coupled by frequency modulation, said oscillator comprising
 a laser amplifier;
 a first and a second reflector at each end thereof;
 a frequency modulator disposed between one reflector and the laser amplifier; said modulator including
 a birefringeant element having an optical axis oriented along the optical axis between said laser amplifier and the second reflector;
 an optically non-linear KDP crystal having an optical axis oriented at about 60° with respect to said optical axis, such angle being characteristic to said element for causing maximum interaction between said rays; said optically nonlinear KDP crystal disposed on said optical axis outside said second reflector;
 said laser oscillator producing two frequency modulated rays having a modulation frequency which slightly deviates from the frequency difference between adjacent self-oscillations;
and means delaying said rays with respect to each other;
whereby an unmodulated light ray is obtained whose frequency equals the sum of the carrier frequencies of said modulated rays.

* * * * *